United States Patent
Koyabu et al.

(10) Patent No.: US 12,140,561 B2
(45) Date of Patent: Nov. 12, 2024

(54) GAS SENSOR

(71) Applicant: DENSO CORPORATION, Kariya (JP)

(72) Inventors: Tadakatsu Koyabu, Kariya (JP); Yu Murata, Kariya (JP); Yusuke Kawamoto, Kariya (JP); Tomonori Ezaki, Obu (JP)

(73) Assignee: DENSO CORPORATION, Kariya (JP)

( * ) Notice: Subject to any disclaimer, the term of this patent is extended or adjusted under 35 U.S.C. 154(b) by 622 days.

(21) Appl. No.: 17/389,527

(22) Filed: Jul. 30, 2021

(65) Prior Publication Data

US 2021/0356424 A1 Nov. 18, 2021

Related U.S. Application Data

(63) Continuation of application No. PCT/JP2019/050736, filed on Dec. 25, 2019.

(30) Foreign Application Priority Data

Jan. 31, 2019 (JP) ................................. 2019-016220

(51) Int. Cl.
   *G01N 27/419* (2006.01)
   *G01N 27/409* (2006.01)
   *G01N 27/41* (2006.01)

(52) U.S. Cl.
   CPC ......... *G01N 27/419* (2013.01); *G01N 27/409* (2013.01); *G01N 27/41* (2013.01)

(58) Field of Classification Search
   CPC .. G01N 27/409; G01N 27/41; G01N 27/4175; G01N 27/419; G01N 27/406–41; G01N 33/0004–0075
   See application file for complete search history.

(56) References Cited

U.S. PATENT DOCUMENTS

2016/0209358 A1\* 7/2016 Toudou ................ G01N 27/419
2017/0219513 A1\* 8/2017 Kayama ............. G01N 27/4065

FOREIGN PATENT DOCUMENTS

JP 2002-116180 4/2002

OTHER PUBLICATIONS

Hidekazu (JP 2002/116180) machine translation (Year: 2002).\*

\* cited by examiner

*Primary Examiner* — C. Sun
(74) *Attorney, Agent, or Firm* — Nixon & Vanderhye P.C.

(57) ABSTRACT

A gas sensor includes a measurement chamber, a reference gas chamber, a first cell, and a second cell. The first cell includes a first electrode in the measurement chamber and a second electrode in the reference gas chamber. The second cell includes a third electrode in the measurement chamber and a fourth electrode in the reference gas chamber. A gas sensor detects a first current that flows between the first electrode and the second electrode, detects a second current that flows between the third electrode and the fourth electrode, calculates a concentration of a specific gas component based on a detected value of the second current, estimates a change amount of oxygen concentration in the reference gas chamber based on a detected value of the first current, and corrects the detected value of the second current based on an estimated value of the change amount of the oxygen concentration.

12 Claims, 8 Drawing Sheets

GAS SENSOR

CROSS-REFERENCE TO RELATED APPLICATIONS

The present application is a continuation application of International Application No. PCT/JP2019/050736, filed Dec. 25, 2019, which claims priority to Japanese Patent Application No. 2019-016220, filed on Jan. 31, 2019. The contents of these applications are incorporated herein by reference in their entirety.

BACKGROUND

Technical Field

The present disclosure relates to a gas sensor.

Related Art

A gas sensor with a measurement chamber into which exhaust gas is introduced is known. The measurement chamber is formed as a space that is sandwiched between a first solid electrolyte body and a second solid electrolyte body. The gas sensor includes a pump cell and a sensor cell. In the pump cell, a current flows which depends on a concentration of oxygen while oxygen in the exhaust gas introduced into the measurement chamber is discharged into the atmosphere. In the sensor cell, a current flows which depends on a concentration of nitrogen oxides from gas components after the oxygen is discharged.

SUMMARY

One aspect of the present disclosure provides a gas sensor which includes a measurement chamber, a reference gas chamber, a first cell, and a second cell. The first cell includes a first electrode provided in the measurement chamber and a second electrode provided in the reference gas chamber. The second cell includes a third electrode provided in the measurement chamber and a fourth electrode provided in the reference gas chamber. A gas sensor detects a value of a first current that flows between the first electrode and the second electrode, detects a value of a second current that flows between the third electrode and the fourth electrode, calculates a concentration of a specific gas component based on a detected value of the second current, estimates a change amount of oxygen concentration in the reference gas chamber based on a detected value of the first current, and corrects the detected value of the second current based on an estimated change amount of the oxygen concentration.

DESCRIPTION OF THE EMBODIMENTS

Figure 1:
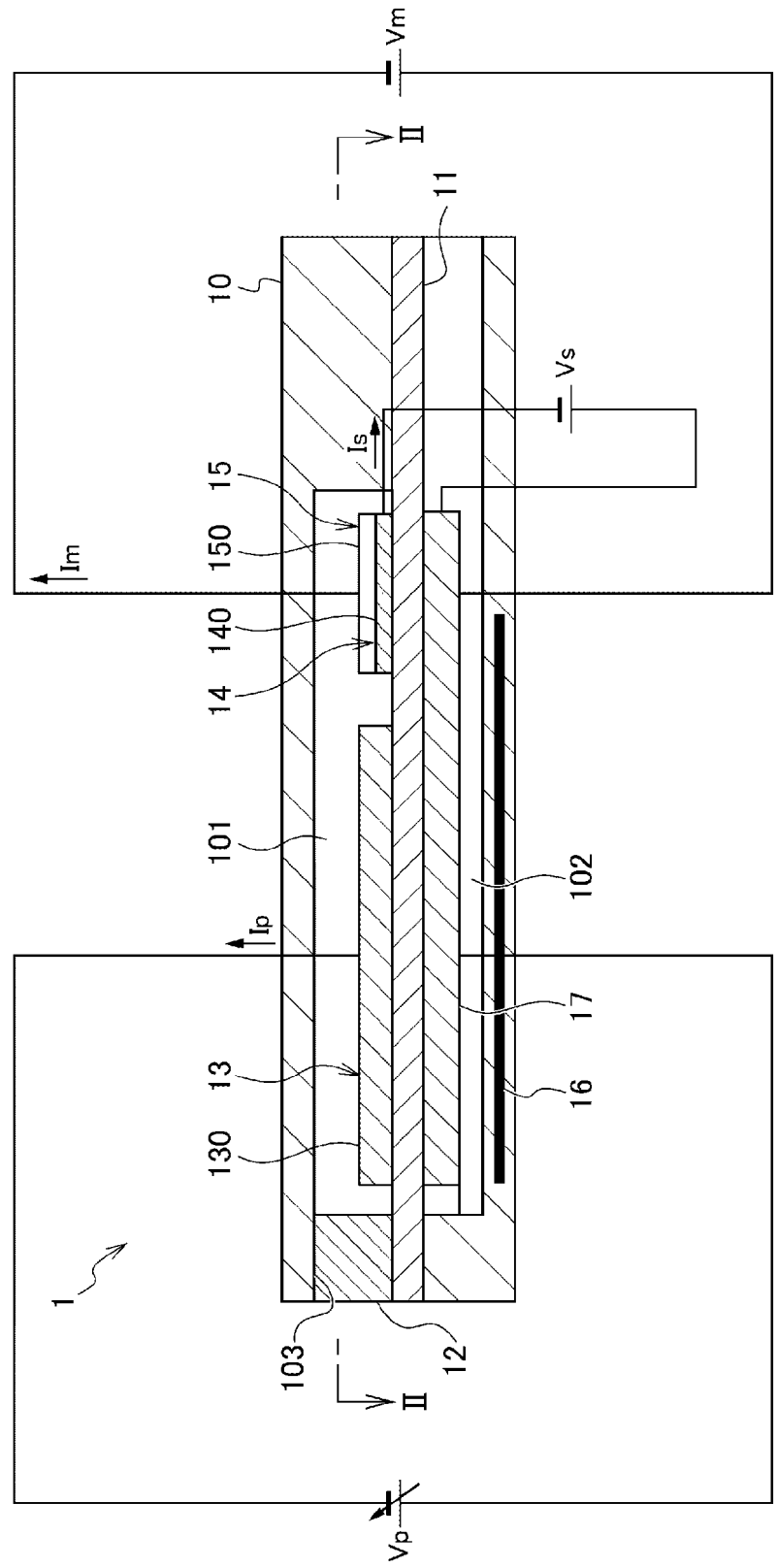
FIG. 1 is a cross-sectional view of a structure of a gas sensor according to a first embodiment.

JP-A-2002-116180 describes a gas sensor that is provided with a measurement chamber into which exhaust gas is introduced. The measurement chamber is formed as a space that is sandwiched between a first solid electrolyte body and a second solid electrolyte body. The gas sensor described in JP-A-2002-116180 includes a pump cell through which a current flows which depends on a concentration of oxygen while oxygen in the exhaust gas that is introduced into the measurement chamber is discharged into the atmosphere, and a sensor cell through which a current flows which depends on a concentration of nitrogen oxides from gas components after the oxygen is discharged.

The pump cell is configured by the first solid electrolyte body, a pump electrode that is provided on one surface of the first solid electrolyte body that faces the measurement chamber, and a reference electrode that is provided on another surface of the first solid electrolyte body. The sensor cell includes the second solid electrolyte body, a sensor electrode that is provided on one surface of the second solid electrolyte body that faces the measurement chamber, and a reference electrode that is provided on another surface of the second solid electrolyte body. The reference electrode of the sensor cell is arranged in a reference gas chamber into which atmospheric air is introduced.

The gas sensor described in JP-A-2002-116180 further includes a control circuit that detects respective currents that flow through the pump cell and the sensor cell. In the sensor cell, oxygen concentration dependence in which the current of the sensor cell changes based on changes in the oxygen concentration in the exhaust gas is present. To resolve the oxygen concentration dependence of the current of the sensor cell, in the control circuit, the current of the sensor cell is corrected based on a pump current that flows through the pump cell. In the gas sensor described in JP-A-2002-116180, the concentration of nitrogen oxides is detected based on the corrected current of the sensor cell.

In the gas sensor described in JP-A-2002-116180, only the reference electrode of the sensor cell is arranged in the reference gas chamber. However, the reference electrode of the pump cell and the reference electrode of the sensor cell may both be arranged in the reference gas chamber. However, when such a structure is used in the gas sensor, an issue such as that below may arise.

When the reference electrode of the pump cell is arranged in the reference gas chamber, the oxygen in the exhaust gas is discharged into the reference gas chamber by the pump cell. Therefore, when the oxygen concentration in the exhaust gas suddenly changes, the oxygen concentration in the reference gas chamber also suddenly changes. As a result, the oxygen concentration in the reference gas chamber may become higher than an actual oxygen concentration in atmospheric air. When the oxygen concentration in the reference gas chamber increases in this manner, changes occur in an electromotive force that is generated between the sensor electrode and the reference electrode. Electric charge based on electrostatic capacitances of the sensor electrode and the reference electrode is stored between the sensor electrode and the reference electrode.

When the electromotive force that is generated between the sensor electrode and the reference electrode changes, a change also occurs in the electric charge that is stored between the sensor electrode and the reference electrode. This becomes a factor in the current of the sensor cell being changed. As a result of changes occurring in the current of the sensor cell due to changes in the oxygen concentration in the reference gas chamber in this manner, changes also occur in a detected concentration value of nitrogen oxides. This becomes a factor in an error occurring in the detected concentration value of nitrogen oxides.

It is thus desired to to provide a gas sensor that is capable of detecting a concentration of a specific gas component with higher accuracy.

An exemplary embodiment of the present disclosure provides a gas sensor that includes a measurement chamber, a reference gas chamber, a first cell, a second cell, a first current detecting unit, a second current detecting unit, a calculating unit, and a correcting unit. Exhaust gas is introduced into the measurement chamber. A reference gas is introduced into the reference gas chamber.

The first cell includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode.

The second cell includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell.

The first current detecting unit detects a value of a first current that flows between the first electrode and the second electrode. The second current detecting unit detects a value of the second current. The calculating unit calculates the concentration of the specific gas component based on a detected value of the second current detected by the second current detecting unit. The correcting unit estimates a change amount of oxygen concentration in the reference gas chamber based on a detected value of the first current detected by the first current detecting unit, and corrects the detected value of the second current based on an estimated change amount of the oxygen concentration in the reference gas chamber.

In this configuration, the detected value of the second current is corrected based on the estimated change amount of the oxygen concentration in the reference gas chamber when changes occur in the oxygen concentration in the reference gas chamber. This makes it possible to reduce an influence of the changes in the oxygen concentration in the reference gas chamber on the detected value of the second current. The concentration of the specific gas component is calculated based on the corrected value of the second current. Thus, the concentration of the specific gas component can be detected with higher accuracy.

Embodiments of a gas sensor will hereinafter be described with reference to the drawings. To facilitate understanding of the descriptions, identical constituent elements in the drawings are given the same reference numbers as much as possible, and redundant descriptions are omitted.

First Embodiment

For example, a gas sensor 1 according to a present embodiment shown in FIG. 1 is arranged in an exhaust passage of a vehicle. An exhaust purification apparatus that purifies harmful substances such as carbon monoxide and nitrogen oxides that are contained in exhaust gas that is discharged from an internal combustion engine is provided in the exhaust passage. The gas sensor 1 detects a concentration of nitrogen oxides that are contained in the exhaust gas that passes through the exhaust purification apparatus, and outputs a signal based on the detected concentration of nitrogen oxides. Hereafter, the nitrogen oxides are also referred to as $NO_X$. According to the present embodiment, $NO_X$ corresponds to a specific gas component that is contained in the exhaust gas.

As shown in FIG. 1, the gas sensor 1 includes a main body portion 10, a solid electrolyte body 11, a diffusion resistance body 12, a pump cell 13, a sensor cell 14, a monitor cell 15, and a heater 16.

The main body portion 10 is arranged such as to sandwich the solid electrolyte body 11 in a thickness direction with predetermined gaps therebetween. One gap that is formed between the main body portion 10 and the solid electrolyte body 11 forms a measurement chamber 101. An introduction hole 103 that passes through to the measurement chamber 101 from an outer peripheral surface of the main body portion 10 is formed in the main body portion 10. Another gap that is formed between the main body portion 10 and the solid electrolyte body 11 forms a reference gas chamber 102. Atmospheric air that serves as a reference oxygen concentration gas is introduced into the reference gas chamber 102 through an atmosphere opening that is provided in the gas sensor 1.

The diffusion resistance body 12 is arranged in the introduction hole 103. The diffusion resistance body 12 is composed of a porous member such as alumina or a member that has fine pores. The diffusion resistance body 12 is provided to restrict an amount of exhaust gas that is introduced into the measurement chamber 101.

The pump cell 13 is arranged in a position closer to the introduction hole 103 than the sensor cell 14 and the monitor cell 15. The pump cell 13 removes oxygen in the exhaust gas that is introduced from the introduction hole 103. According to the present embodiment, the pump cell 13 corresponds to a first cell.

The pump cell 13 is configured by the solid electrolyte body 11, a pump electrode 130 that is arranged on a surface of the solid electrolyte body 11 on the measurement chamber 101 side, and a common electrode 17 that is arranged on a surface of the solid electrolyte body 11 on the reference gas chamber 102 side. The pump electrode 130 is configured by an $NO_X$ inactive electrode that does not easily decompose $NO_X$, such as an electrode that is composed of a Pt—Au (platinum-gold) alloy. The common electrode 17 is arranged such as to extend to an area that corresponds to the sensor cell 14. A pump voltage Vp is applied between the pump electrode 130 and the common electrode 17. According to the present embodiment, the pump cell 13 corresponds to the first cell. The pump electrode 130 corresponds to a first electrode. The common electrode 17 corresponds to a second electrode.

The exhaust gas that is introduced into the measurement chamber 101 through the introduction hole 103 comes into contact with the pump electrode 130. When the oxygen in the exhaust gas comes into contact with the pump electrode 103, oxygen ions are generated in the pump electrode 130. The oxygen ions flow inside the solid electrolyte body 11 towards the common electrode 17, release electric charge in the common electrode 17, and become oxygen. The oxygen is released into the atmosphere from the reference gas chamber 102. A pump current Ip flows between the pump electrode 130 and the common electrode 17 based on a flow of electric charge at this time. Therefore, the pump current Ip indicates an amount of removal of oxygen in the pump cell 13, or in other words, a value that is based on the oxygen concentration in the exhaust gas. According to the present embodiment, the pump current Ip corresponds to a first current.

Figure 2:
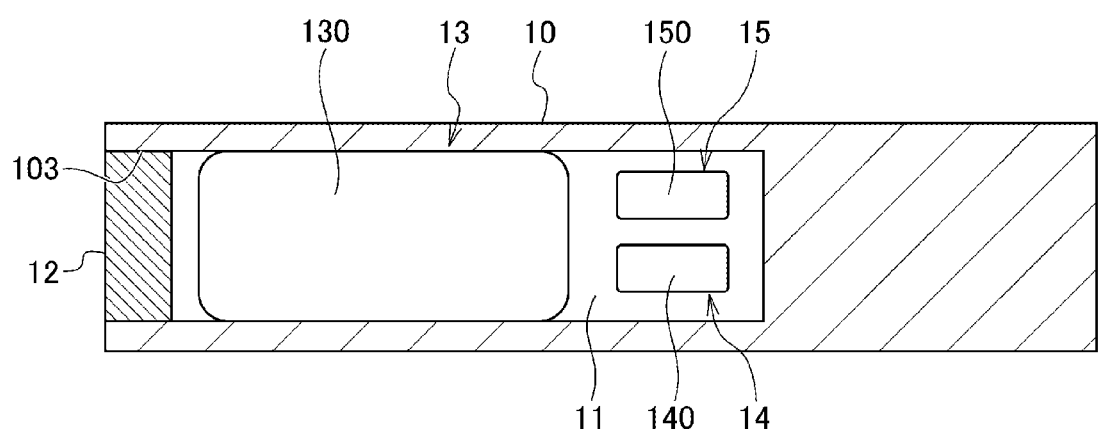
FIG. 2 is a cross-sectional view of a structure taken along line II-II in FIG. 1.

As shown in FIG. 2, the sensor cell 14 is arranged in a position farther away from the introduction hole 103 than the pump cell 13. The sensor cell 14 detects an $NO_X$ concentration in the exhaust gas that passes through the pump cell 13. According to the present embodiment, the sensor cell 14 corresponds to a second cell.

As shown in FIG. 1, the sensor cell 14 is configured by the solid electrolyte body 11, a sensor electrode 140 that is arranged on the surface of the solid electrolyte body 11 on the measurement chamber 101 side, and the common electrode 17. The sensor electrode 140 is configured by an $NO_X$ active electrode that easily decomposes $NO_X$, such as an electrode that is composed of a Pt—Rh (platinum-rhodium) alloy. A sensor voltage Vs is applied between the sensor electrode 140 and the common electrode 17. According to the present embodiment, the sensor cell 14 corresponds to the second cell. The sensor electrode 140 corresponds to a third electrode. The common electrode 17 corresponds to a fourth electrode.

The exhaust gas that has passed through the pump electrode 130, that is, the exhaust gas from which oxygen has been removed comes into contact with the sensor electrode 140. As a result of the $NO_X$ in the exhaust gas coming into contact with the sensor electrode 140, the $NO_X$ is decomposed into nitrogen and oxygen in the sensor electrode 140. In addition, residual oxygen in the exhaust gas that could not be removed by the pump electrode 130 also comes into contact with the sensor electrode 140.

As a result of the oxygen that is decomposed in the sensor electrode and the residual oxygen in the exhaust gas coming into contact with the sensor electrode 140, oxygen ions are generated in the sensor electrode 140. The oxygen ions flow inside the solid electrolyte body 11 towards the common electrode 17, releases electric charge in the common electrode 17, and becomes oxygen. The oxygen is released into the atmosphere from the reference gas chamber 102. A sensor current Is flows between the sensor electrode 140 and the common electrode 17 based on a flow of electric charge at this time. Therefore, the sensor current Is indicates a value that is based on the $NO_X$ concentration and the concentration of residual oxygen in the exhaust gas. According to the present embodiment, the sensor current Is corresponds to a second current.

As shown in FIG. 2, the monitor cell 15 is arranged such as to be in line with the sensor cell 14. The monitor cell 15 detects the concentration of residual oxygen in the exhaust gas that has passed through the pump cell 13.

As shown in FIG. 1, the monitor cell 15 is configured by the solid electrolyte body 11, a monitor electrode 150 that is arranged on the surface of the solid electrolyte body 11 on the measurement chamber 101 side, and the common electrode 17. The monitor electrode 150 is configured by an $NO_X$ inactive electrode that does not easily decompose $NO_X$, such as an electrode that is composed of a Pt—Au (platinum-gold) alloy. A monitor voltage Vm is applied between the monitor electrode 150 and the common electrode 17. According to the present embodiment, the monitor cell 15 corresponds to a third cell. The monitor electrode 150 corresponds to a fifth electrode. The common electrode 17 corresponds to a sixth electrode.

The exhaust gas from which oxygen has been removed by the pump electrode 130 comes into contact with the monitor electrode 150. As a result of the residual oxygen in the exhaust gas coming into contact with the monitor electrode 150, oxygen ions are generated in the monitor electrode 150. The oxygen ions flow inside the solid electrolyte body 11 towards the common electrode 17, release electric charge in the common electrode 17, and become oxygen. The oxygen is released into the atmosphere from the reference gas chamber 102. A monitor current Im flows between the monitor electrode 150 and the common electrode 17 based on a flow of electric charge at this time. Therefore, the monitor current Im indicates a value that is based on the concentration of residual oxygen in the exhaust gas. According to the present embodiment, the monitor current Im corresponds to a third current.

The heater 16 is provided inside the main body portion 10. The heater 16 heats the solid electrolyte body 11 by generating heat based on energization, and holds a temperature of the solid electrolyte body 11 to an activation temperature.

Figure 3:
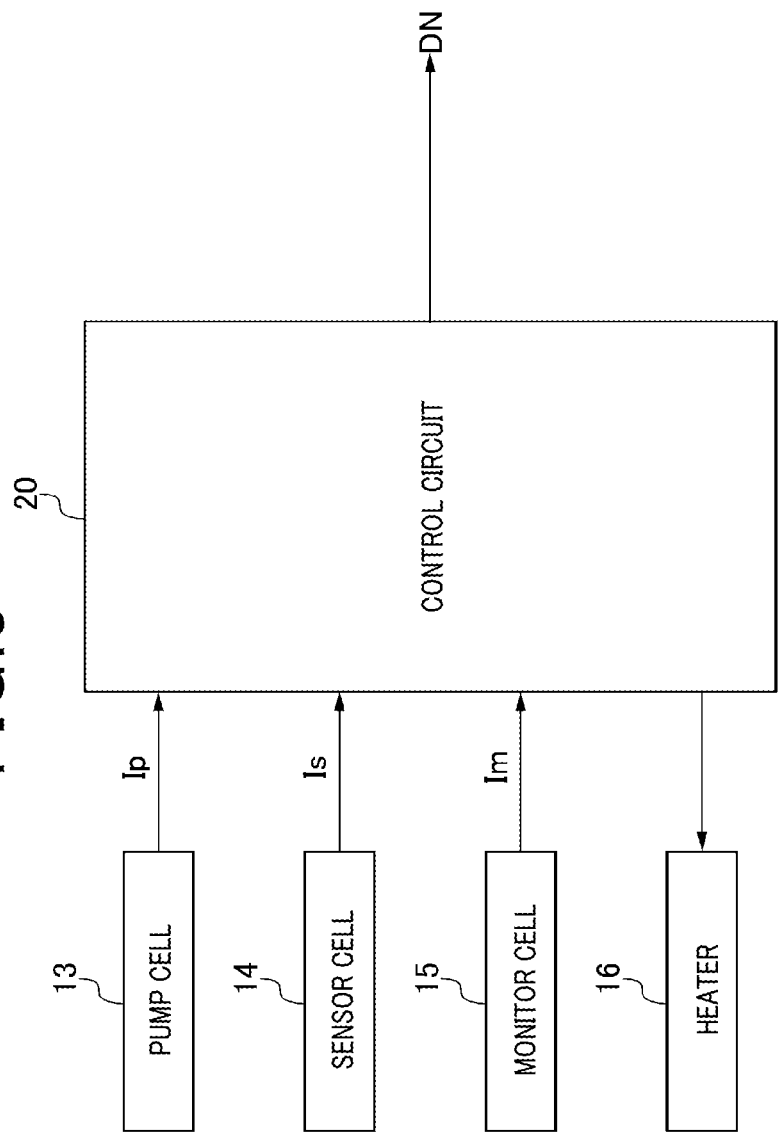
FIG. 3 is a block diagram illustrating an electrical configuration of the gas sensor according to the first embodiment.

As shown in FIG. 3, the gas sensor 1 further includes a control circuit 20 that oversees various calculation processes, driving control of the heater 16, and the like. For example, the control circuit 20 performs calculation of a detected value of $NO_X$ concentration DN as the various calculation processes. Specifically, the pump current Ip that is outputted from the pump cell 13, the sensor current Is that is outputted from the sensor cell 14, and the monitor current Im that is outputted from the monitor cell 15 are taken into the control circuit 20. The control circuit 20 detects the pump current Ip that is outputted from the pump cell 13, the sensor current Is that is outputted from the sensor cell 14, and the monitor current Im that is outputted from the monitor cell 15.

A detected value of the pump current Ip detected by the control circuit 20 has a correlation with the oxygen concentration in the exhaust gas. A detected value of the sensor current Is detected by the control circuit 20 has a correlation with the $NO_X$ concentration and the residual oxygen in the exhaust gas. A detected value of the monitor current Im detected by the control circuit 20 has a correlation with the residual oxygen in the exhaust gas. Using the foregoing, the control circuit 20 subtracts the detected value of the monitor current Im from the detected value of the sensor current Is, and calculates the detected value of $NO_X$ concentration DN based on the subtracted value. The control circuit 20 outputs the calculated detected value of $NO_X$ concentration DN to a control apparatus that is mounted in the vehicle, such as a control apparatus that controls the internal combustion engine of the vehicle.

Here, in the gas sensor 1 having such a configuration, for example, in cases such as when fuel-cut control is performed in the internal combustion engine, the oxygen concentration in the exhaust gas that is introduced into the measurement chamber 101 may suddenly change.

When the oxygen concentration in the exhaust gas that is introduced into the measurement chamber 101 suddenly changes, the oxygen concentration in the reference gas chamber 102 also suddenly changes as a result of the oxygen in the exhaust gas being discharged into the reference gas chamber 102 by the pump cell 13. The oxygen concentration in the reference gas chamber 102 is ordinarily substantially equal to the oxygen concentration in atmospheric air.

When the oxygen that is discharged into the reference gas chamber 102 by the pump cell 13 suddenly changes, the oxygen concentration in the reference gas chamber 102 becomes a value that is greater than the oxygen concentration in atmospheric air. Such changes in the oxygen concentration in the reference gas chamber 102 are a factor in an error occurring in the detected value of $NO_X$ concentration detected by the control circuit 20.

Specifically, when the oxygen concentration in the reference gas chamber 102 is held at the oxygen concentration in atmospheric air, the electromotive force that is generated in the sensor cell 14 is a substantially fixed value. Therefore, an effective voltage that is actually applied to the sensor cell 14 is a value that is obtained by the electromotive force of the sensor cell 14 being subtracted from the sensor voltage Vs.

Meanwhile, when the oxygen concentration in the reference gas chamber 102 starts to increase due to increase in the oxygen concentration in the exhaust gas, changes occur in the electromotive force of the sensor cell 14. Changes also occur in the effective voltage of the sensor cell 14 in accompaniment with the changes in the electromotive force of the sensor cell 14. In the sensor cell 14, electric charge that is based on electrostatic capacitances of the sensor electrode 14 and the common electrode 17 is stored between the sensor electrode 140 and the common electrode 17.

Therefore, when changes occur in the effective voltage of the sensor cell 14, changes also occur in the electric charge that is stored between the sensor electrode 140 and the common electrode 17. As a result of such changes in the electric charge of the sensor cell 14, a current that is based on an amount of change in electric charge flows to the sensor cell 14. In this case, regardless of the actual $NO_X$ concentration in the exhaust gas not having changed, changes occur in the detected value of the sensor current Is. Similar changes also occur in the detected value of the monitor current Im.

As a result of such detected value of the sensor current Is and detected value of the monitor current Im, changes occur in the detected value of $NO_X$ concentration DN that is calculated from the detected value of the sensor current Is and the detected value of the monitor current Im. Consequently, the $NO_X$ concentration in the exhaust gas is erroneously detected.

Here, in the control circuit 20 of the gas sensor 1 according to the present embodiment, respective correction values Isa and Ima of the detected value of the sensor current Is and the detected value of the monitor current Im are calculated based on a change with time of the oxygen concentration in the reference gas chamber 102, and the detected value of the sensor current Is and the detected value of the monitor current Im are corrected based on the calculated correction values Isa and Ima. Here, in the control circuit 20, taking advantage of a correlation being present between the change with time of the oxygen concentration in the reference gas chamber 102 and the detected value of the pump current Ip, the detected value of the pump current Ip is used as a change amount estimation value of the oxygen concentration in the reference gas chamber 102.

Figure 4:
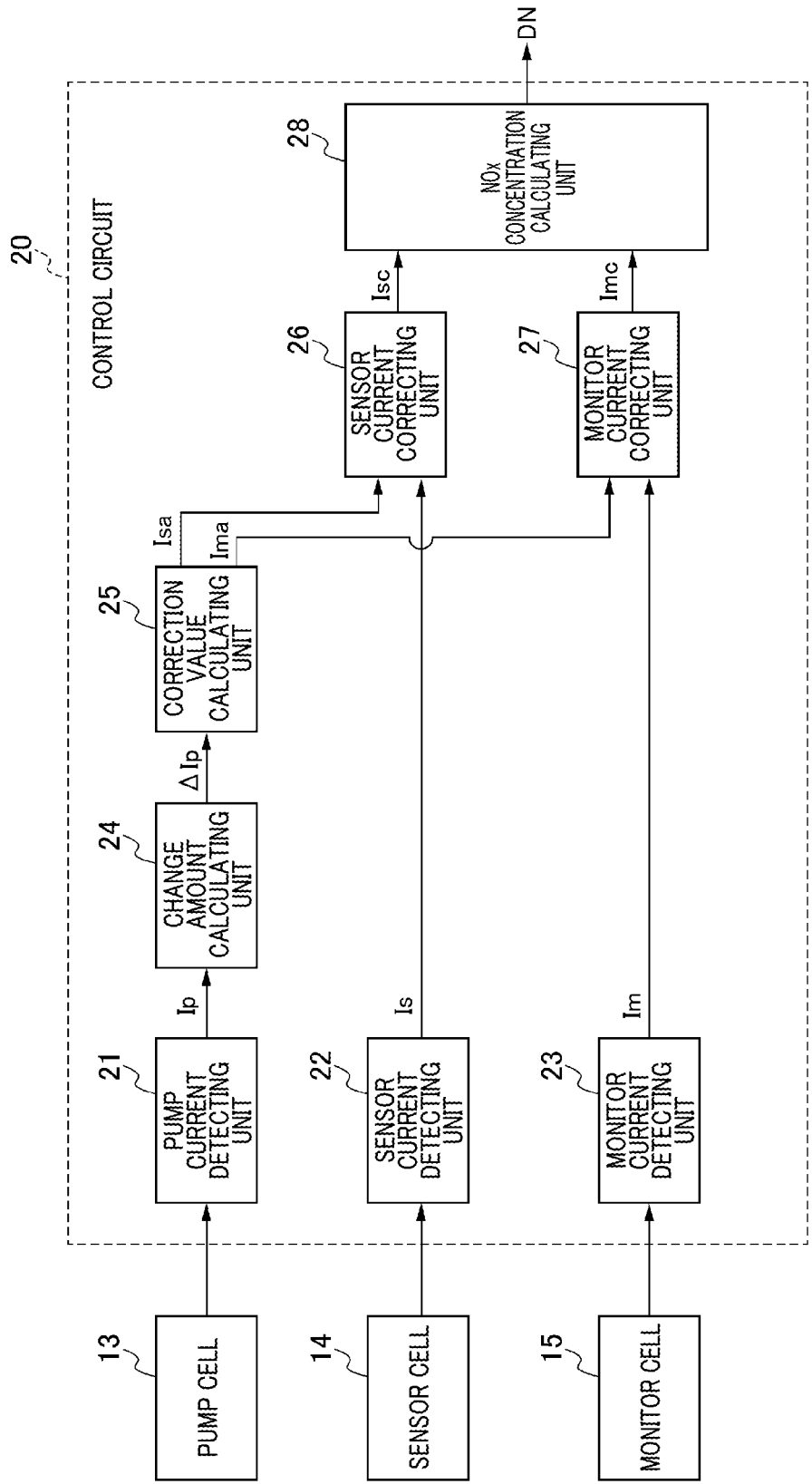
FIG. 4 is a block diagram illustrating a configuration of a control circuit of the gas sensor according to the first embodiment.

Specifically, as shown in FIG. 4, the control circuit 20 includes a pump current detecting unit 21, a sensor current detecting unit 22, a monitor current detecting unit 23, a change amount calculating unit 24, a correction value calculating unit 25, a sensor current correcting unit 26, a monitor current correcting unit 27, and a $NO_X$ concentration calculating unit 28.

According to the present embodiment, the correction value calculating unit 25 and the sensor current correcting unit 26 correspond to a first correcting unit that corrects the detected value of the second current. In addition, the correction value calculating unit 25 and the monitor current correcting unit 27 correspond to a second correcting unit that corrects the detected value of the third current.

The pump current detecting unit 21 detects the pump current Ip that is outputted from the pump cell 13 and outputs the detected value of the pump current Ip to the change amount calculating unit 24. According to the present embodiment, the pump current detecting unit 21 corresponds to a first current detecting unit. The detected value of the pump current Ip corresponds to the detected value of the first current.

The sensor current detecting unit 22 detects the sensor current Is that is outputted from the sensor cell 14 and outputs the detected value of the sensor current Is to the sensor current correcting unit 26. According to the present embodiment, the sensor current detecting unit 22 corresponds to a second current detecting unit. The detected value of the sensor current Is corresponds to the detected value of the second current.

The monitor current detecting unit 23 detects the monitor current Im that is outputted from the monitor cell 15 and outputs the detected value of the monitor current Im to the monitor current correcting unit 27. According to the present embodiment, the monitor current detecting unit 23 corresponds to a third current detecting unit. The detected value of the monitor current Im corresponds to the detected value of the third current.

The change amount calculating unit 24 calculates a rate of change with time $\Delta Ip$ of the detected value of the pump current Ip, or in other words, a change amount $\Delta Ip$ of the detected value of the pump current Ip per unit time, based on the detected value of the pump current Ip outputted from the pump current detecting unit 21. The change amount calculating unit 24 performs the calculation of the rate of change with time $\Delta Ip$ of the detected value of the pump current at a predetermined cycle. The change amount calculating unit 24 outputs the calculated rate of change with time $\Delta Ip$ of the detected value of the pump current to the correction value calculating unit 25.

The correction value calculating unit 25 calculates the correction value Isa of the detected value of the sensor current Is and the correction value Ima of the detected value of the monitor current Im based on the rate of change with time $\Delta Ip$ of the detected value of the pump current outputted from the change amount calculating unit 24.

Figure 5:
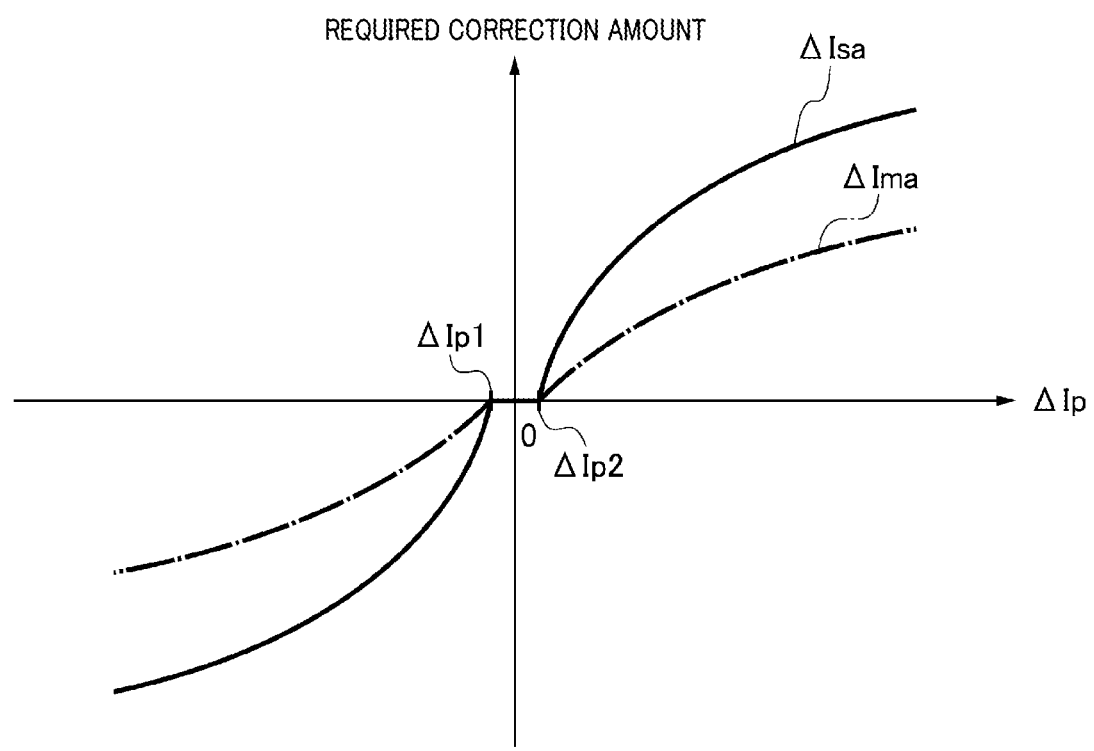
FIG. 5 is a graph illustrating a relationship between a change with time ΔIp of a detected value of a pump current and a required correction amount ΔIsa of the detected value of the pump current, and a relationship between the change with time ΔIp of the detected value of the pump current and a required correction amount ΔIma of a detected value of a monitor current.

Specifically, in the gas sensor 1 according to the present embodiment, a map that indicates a relationship between the rate of change with time $\Delta Ip$ of the detected value of the pump current and a required correction amount $\Delta Isa$ of the detected value of the sensor current, and a relationship between the rate of change with time $\Delta Ip$ of the detected value of the pump current and a required correction amount ΔIma of the detected value of the monitor current, such as that shown in FIG. 5, is determined in advance through experiments and the like.

The map shown in FIG. 5 is that in which, upon respective changes with time of the detected value of the sensor current Is and the detected value of the monitor current Im in relation to the rate of change with time ΔIp of the detected value of the pump current being determined through experiments and the like, the respective required correction amounts ΔIsa and ΔIma of the detected value of the sensor current Is and the detected value of the monitor current Im that are required to cancel the change amounts are indicated by a graph.

In the map shown in FIG. 5, when the rate of change with time ΔIp of the detected value of the pump current is a value that is within a range of [ΔIp1≤ΔIp≤ΔIp2] that is set near zero, a so-called dead zone in which the required correction amounts ΔIsa and ΔIma are set to zero is provided. The map shown in FIG. 5 is stored in advance in a storage apparatus of the control circuit 20. The correction value calculating unit 25 calculates the required correction amount ΔIsa of the detected value of the sensor current and the required correction amount ΔIma of the detected value of the monitor current from the rate of change with time ΔIp of the detected value of the pump current using the map shown in FIG. 5, and sets the correction values Isa and Ima based on the calculated required correction values ΔIsa and ΔIma.

Figure 6:
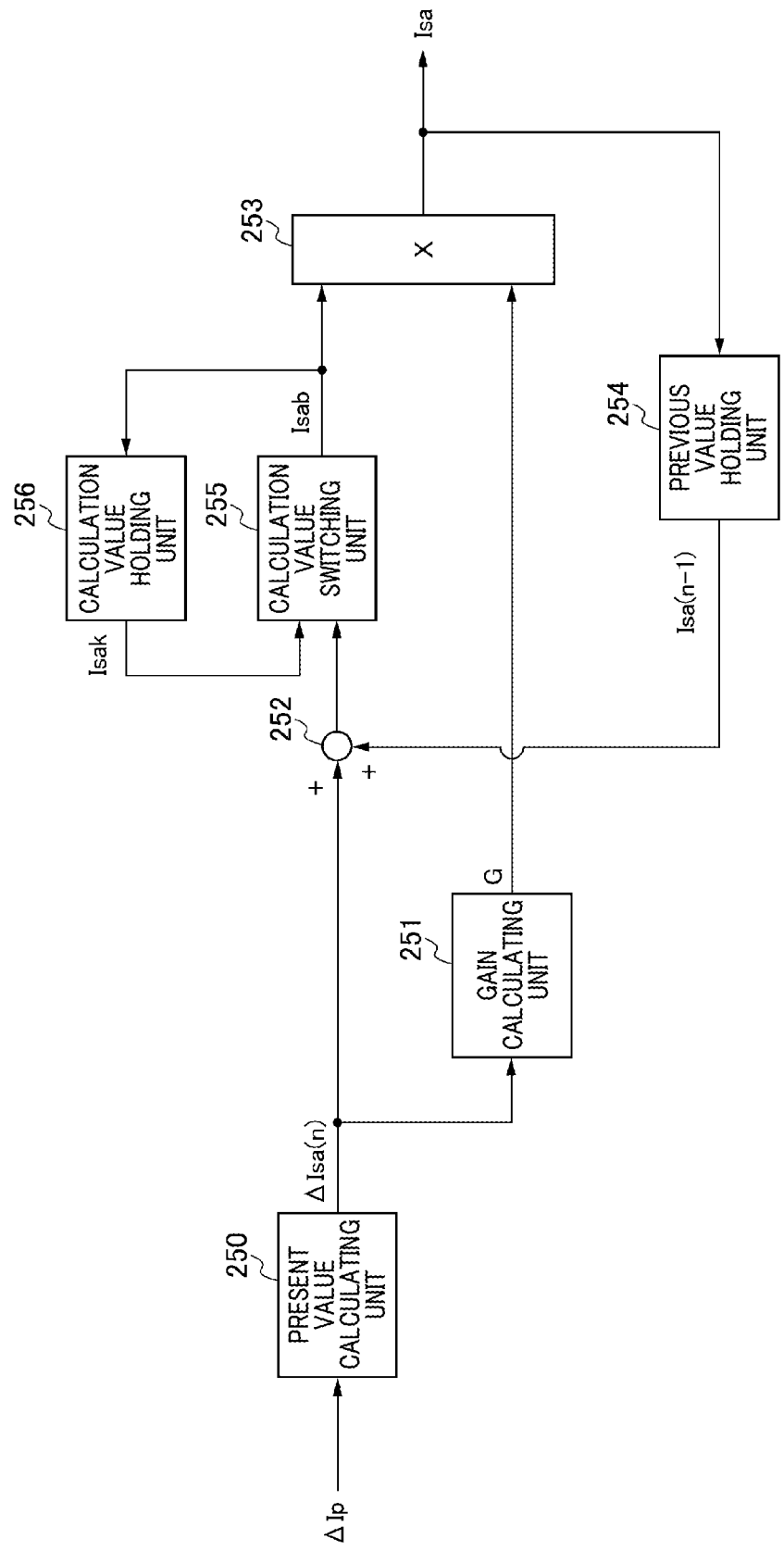
FIG. 6 is a block diagram illustrating a configuration of a correction value calculating unit of the control circuit according to the first embodiment.

FIG. 6 is a block diagram showing in detail a configuration of a portion of the correction value calculating unit 25 that sets the correction value Isa of the detected value of the sensor current Is.

As shown in FIG. 6, in the correction value calculating unit 25, the rate of change with time ΔIp of the detected value of the pump current calculated by the change amount calculating unit 24 is inputted to present value calculating unit 250. The present value calculating unit 250 calculates a present value ΔIsa(n) of the required correction amount of the detected value of the sensor current from the rate of change with time ΔIp of the detected value of the pump current using the map shown in FIG. 5. The present value calculating unit 250 performs the calculation of the present value ΔIsa(n) at a predetermined cycle and outputs the calculated present value ΔIsa(n) to a gain calculating unit 251 and an adding unit 252.

The adding unit 252 adds the present value ΔIsa(n) that is calculated by the present value calculating unit 250 and a previous value Isa(n−1) that is held by a previous value holding unit 254, and outputs an added value thereof [ΔIsa(n)+Isa(n−1)] to a calculation value switching unit 255.

The calculation value switching unit 255 outputs either of the added value [ΔIsa(n)+Isa(n−1)] calculated by the adding unit 252 and a held value Isak held by a calculation value holding unit 256 to a multiplying unit 253 as a basic correction value Isab. Specifically, when the present value ΔIsa(n) is zero, the calculation value switching unit 255 outputs the held value Isak that is held by the calculation value holding unit 256 to the multiplying unit 253 as the basic correction value Isab. In addition, when the present value ΔIsa(n) is a value other than zero, the calculation value switching unit 255 outputs the added value [ΔIsa(n)+Isa(n−1)] that is calculated by the adding unit 252 to the multiplying unit 253 as the basic correction value Isab.

The calculation value holding unit 256 holds the basic correction value Isab that is outputted to the multiplying unit 253 from the calculation value switching unit 255. That is, when the present value ΔIsa(n) is zero, the held value Isak that is held by the calculation value holding unit 256 is outputted from the calculation value switching unit 255 as the basic correction value Isab. Therefore, the calculation value holding unit 256 holds the held value Isak as is. Meanwhile, when the present value ΔIsa(n) is a value other than zero, the added value [ΔIsa(n)+Isa(n−1)] is outputted from the calculation value switching unit 255 as the basic correction value Isab. Therefore, the calculation value holding unit 256 holds the added value [ΔIsa(n)+Isa(n−1)] as the held value Isak.

Figure 7:
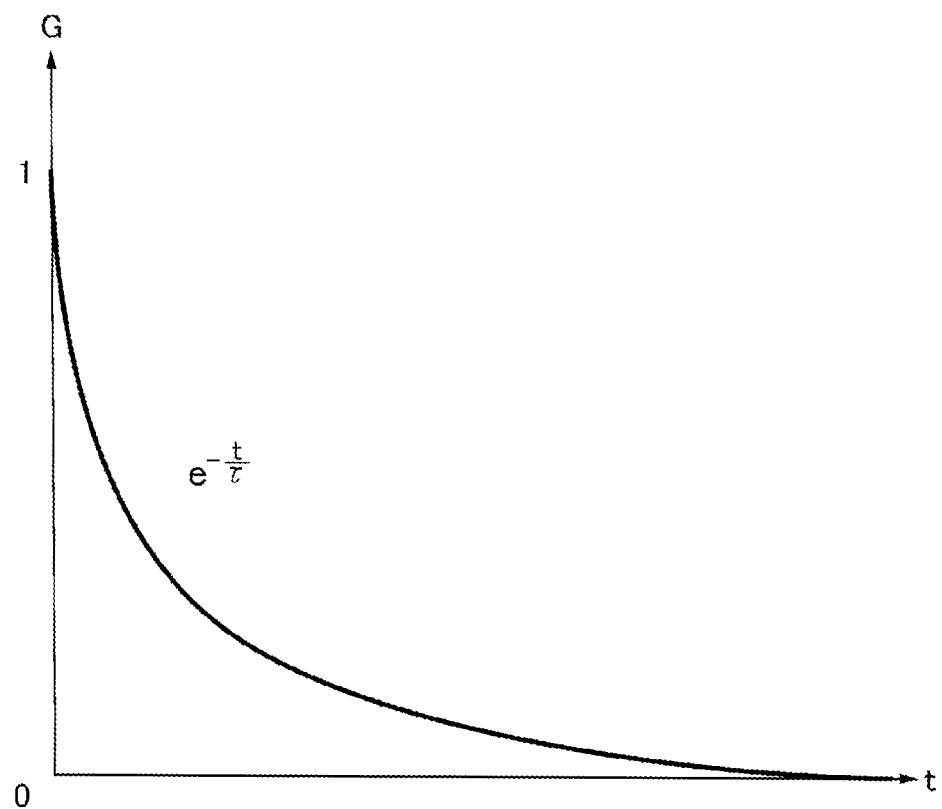
FIG. 7 is a map for calculating a gain G that is used in the control circuit according to the first embodiment.

The gain calculating unit 251 calculates a gain G based on a time constant ti when the present value ΔIsa(n) calculated by the present value calculating unit 250 is inputted, based on an elapsed time t from this point, using a map shown in FIG. 7. The elapsed time t is equal to an elapsed time from when the present value ΔIsa(n) is calculated. In the map shown in FIG. 7, the gain G is set to be attenuated in accompaniment with the elapse of time t. The map shown in FIG. 7 is stored in advance in the storage apparatus of the control apparatus 20. As shown in FIG. 6, the gain calculating unit 251 outputs the calculated gain G to the multiplying unit 253.

The multiplying unit 253 multiplies the basic correction value Isab outputted from the calculation value switching unit 255 by the gain G calculated by the gain calculating unit 251, and outputs a multiplied value thereof [G×Isab]. The multiplied value [G×Isab] is outputted from the correction value calculating unit 25 as the correction value Isa of the detected value of the sensor current Is.

As shown in FIG. 6, the previous value holding unit 253 holds the correction value Isa that is currently calculated by the multiplying unit 253 as the previous value Isa(n−1).

Here, a configuration in which the correction value calculating unit 25 calculates the correction value Ima of the detected value of the monitor current Im is a configuration that is similar to the configuration shown in FIG. 6. Therefore, a detailed description thereof is omitted.

As shown in FIG. 4, the correction value calculating unit 25 respectively outputs the calculated correction values Isa and Ima to the sensor current correcting unit 26 and the monitor current correcting unit 27.

The sensor current correcting unit 26 corrects the detected value of the sensor current Is that is outputted from the sensor current detecting unit 22 based on the correction value Isa outputted from the correction value calculating unit 25. Specifically, the sensor current correcting unit 26 subtracts the correction value Isa from the detected value of the sensor current Is, and outputs a subtracted value thereof [Is−Isa] to the $NO_X$ concentration calculating unit 28 as a detected value of the sensor current Isc after correction.

The monitor current correcting unit 27 corrects the detected value of the monitor current Im that is outputted from the monitor current detecting unit 23 based on the correction value Ima outputted from the correction value calculating unit 25. Specifically, the monitor current correcting unit 27 subtracts the correction value Ima from the detected value of the monitor current Im, and outputs a subtracted value thereof [Im−Ima] to the $NO_X$ concentration calculating unit 28 as a detected value of the monitor current Imc after correction.

The $NO_X$ concentration calculating unit 28 calculates the detected value of $NO_X$ concentration DN from the detected value of the sensor current Isc after correction that is outputted from the sensor current correcting unit 26 and the detected value of the monitor current Imc after correction that is outputted from the monitor current correcting unit, using a map, a calculation expression, or the like.

As a result of the gas sensor 1 according to the present embodiment described above, workings and effects described in (1) to (3) below can be obtained.

(1) In the gas sensor 1 according to the present embodiment, when changes occur in the oxygen concentration in the reference gas chamber 102, the detected value of the sensor current Is and the detected value of the monitor current Im are corrected based on the change with time $\Delta$Ip of the detected value of the pump current, that is, the change amount estimation value of the oxygen concentration in the reference gas chamber 102.

This makes it possible to reduce an influence of the changes in the oxygen concentration in the reference gas chamber 102 on the detected value of the sensor current Is and the detected value of the monitor current Im. The $NO_X$ concentration is calculated based on the corrected detected value of the sensor current Is and detected value of the monitor current Im. Thus, the $NO_X$ concentration can be detected with higher accuracy.

(2) The correction value calculating unit 25 calculates the correction values Isa and Ima based on the change with time $\Delta$Ip of the detected value of the pump current. The sensor current correcting unit 26 corrects the detected value of the sensor current Is based on the correction value Isa. The monitor current correcting unit 27 corrects the detected value of the monitor current Im based on the correction value Ima. As a result of a configuration such as this, the correction values Isa and Ima can be accurately calculated based on the changes in the oxygen concentration in the reference gas chamber 102.

(3) If the oxygen concentration in the reference gas chamber 102 suddenly changes, the oxygen concentration in the reference gas chamber 102 subsequently converges at a predetermined value in accompaniment with the elapse of time. As the oxygen concentration in the reference gas chamber 102 converges at the predetermined value, the change amounts of the detected value of the sensor current Is and the detected value of the monitor current Im decrease.

In correspondence with such changes in the detected value of the sensor current Is and the detected value of the monitor current Im, in the gas sensor 1 according to the present embodiment, the correction values Isa and Ima are decreased in accompaniment with the elapse of time through use of the gain G that is calculated from the map shown in FIG. 7.

As a result, more appropriate correction values Isa and Ima that correspond to the changes in the detected value of the sensor current Is and the detected value of the monitor current Im when the oxygen concentration in the reference gas chamber 102 converges at the predetermined value can be calculated. The $NO_X$ concentration can be calculated with higher accuracy.

Second Embodiment

Next, a second embodiment of gas sensor 1 will be described. Hereafter, differences with the gas sensor 1 according to the first embodiment will mainly be described.

Figure 8:
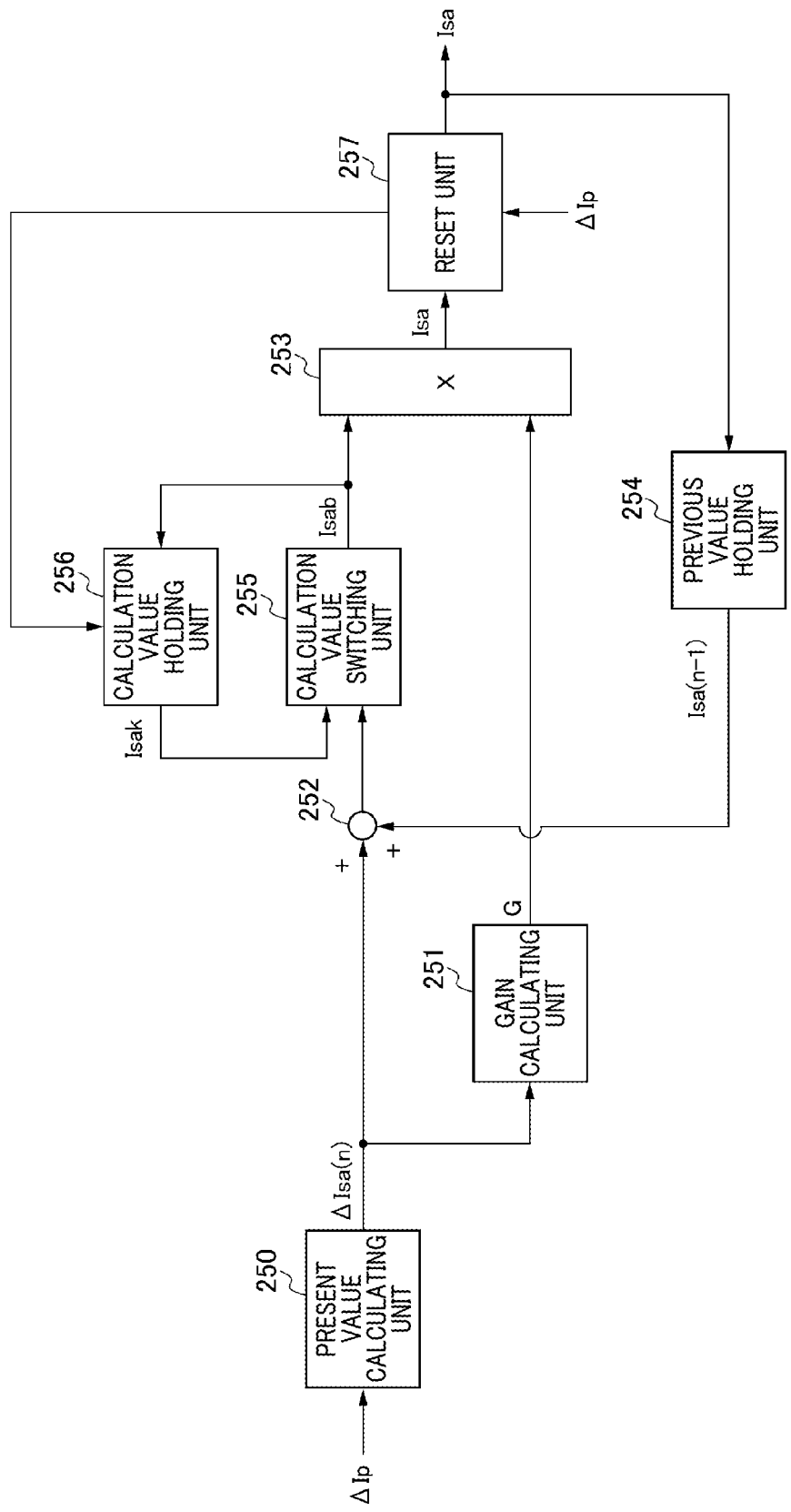
FIG. 8 is a block diagram illustrating a configuration of a correction value calculating unit of a control circuit according to a second embodiment.

As shown in FIG. 8, the correction value calculating unit 25 according to the present embodiment further includes a reset unit 257. The change with time $\Delta$Ip of the detected value of the pump current and the correction value Isa are inputted to the reset unit 257. When the change with time $\Delta$Ip of the detected value of the pump current switches from a positive value to a negative value, the reset unit 257 determines that a change direction of the oxygen concentration in the reference gas chamber 102 has switched from a positive direction to a negative direction. When the change with time $\Delta$Ip of the detected value of the pump current switches from a negative value to a positive value, the reset unit 257 determines that the change direction of the oxygen concentration in the reference gas chamber 102 has switched from the negative direction to the positive direction.

When the change direction of the oxygen concentration in the reference gas chamber 102 is switched from the positive direction to the negative direction or when the change direction of the oxygen concentration in the reference gas chamber 102 is switched from the negative direction to the positive direction, the reset unit 257 resets the correction value Isa of the detected value of the sensor current Is by setting the correction value Isa to zero. In addition, the reset unit 257 similarly sets the held value Isak that is held by the calculation value holding unit 256 to zero.

Here, the correction value calculating unit 25 performs a similar process for the correction value Ima of the detected value of the monitor current Im as well.

As a result of the gas sensor 1 according to the present embodiment described above, workings and effects described in (4) below can further be achieved.

(4) When the change direction of the oxygen concentration in the reference gas chamber 102 is switched from the positive direction to the negative direction or when the change direction of the oxygen concentration in the reference gas chamber 102 is switched from the negative direction to the positive direction, a change direction of the electromotive force that is generated in the sensor cell 14 is switched to a reverse direction. Therefore, a correction direction of the detected value of the sensor current Is is required to be switched to a reverse direction.

In a state such as this, when the correction value Isa that is set before the change direction of the oxygen concentration in the reference gas chamber 102 is switched is used as is as the previous value Isa(n−1), the correction value Isa may not be appropriately set. In this regard, in the gas sensor 1 according to the present embodiment, when the change direction of the oxygen concentration in the reference gas chamber 102 is switched from the positive direction to the negative direction or when the change direction of the oxygen concentration in the reference gas chamber 102 is switched from the negative direction to the positive direction, the correction value Isa is reset.

Therefore, the correction value Isa can subsequently be appropriately set with ease. Consequently, the detected value of the sensor current Is can be more appropriately corrected. Similar workings and effects can be achieved regarding the detected value of the monitor current Im as well.

Other Embodiments

Here, the embodiments can also be carried out according to the modes below.

In the gas sensor 1 according to the embodiments, when the concentration of residual oxygen that is detected by the sensor cell 14 is low enough to be ignored, the monitor cell 15 can be eliminated. In the gas sensor 1 such as this, the $NO_X$ concentration is calculated based on the detected value of the sensor current Is.

In the gas sensor 1 according to the embodiments, the correction values Isa and Ima are decreased in accompaniment with the elapse of time as a result of the gain G being calculated through use of the map shown in FIG. 7. However, instead of the foregoing, the correction values Isa and Ima may be decreased in accompaniment with the elapse of steps in a calculation cycle.

The gas sensor 1 according to the embodiments may be that in which, instead of the common electrode 17, an electrode of the pump cell 13, an electrode of the sensor cell 14, and an electrode of the monitor cell 15 are separately provided.

The control circuit 20 and a control method thereof described in the present disclosure may be actualized by one or a plurality of dedicated computers that are provided such as to be configured by a processor and a memory, the processor being programmed to provide one or a plurality of functions that are realized by a computer program. The control circuit 20 and the control method thereof described in the present disclosure may be actualized by a dedicated computer that is provided such as to be configured by a processor that includes one or a plurality of dedicated hardware logic circuits.

The control circuit 20 and the control method thereof described in the present disclosure may be actualized by one or a plurality of dedicated computers that are configured by a combination of a processor that is programmed to provide one or a plurality of functions, a memory, and a processor that includes one or a plurality of hardware logic circuits. The computer program may be stored in a non-transitory computer-readable storage medium that can be read by a computer as instructions performed by the computer. The dedicated hardware logic circuit and the hardware logic circuit may be actualized by a digital circuit that includes a plurality of logic circuits or an analog circuit.

The present disclosure is not limited to the specific examples described above. The specific examples described above to which design changes have been made by a person skilled in the art are included in the scope of the present disclosure as long as characteristics of the present disclosure are included. Elements that are provided in the specific examples described above, as well as arrangements, conditions, shapes, and the like thereof are not limited to those given as examples and can be modified as appropriate. Combinations of the elements that are provided in the specific examples described above can be modified as appropriate as long as technical inconsistencies do not arise.

What is claimed is:

1. A gas sensor comprising:
   a measurement chamber into which exhaust gas is introduced;
   a reference gas chamber into which a reference gas is introduced;
   a first cell that includes a first electrode that is provided in the measurement chamber and a second electrode that is provided in the reference gas chamber, and removes oxygen that is contained in the exhaust gas that is introduced into the measurement chamber by a voltage being applied between the first electrode and the second electrode;
   a second cell that includes a third electrode that is provided in the measurement chamber and a fourth electrode that is provided in the reference gas chamber, in which a voltage is applied between the third electrode and the fourth electrode, and through which a second current flows which depends on a concentration of a specific gas component that is contained in the exhaust gas from which oxygen has been removed by the first cell; and
   a control circuit, wherein the control circuit is configured to:
   detect a value of a first current that flows between the first electrode and the second electrode;
   detect a value of the second current;
   calculate the concentration of the specific gas component based on the detected value of the second current; and
   estimate a change amount of oxygen concentration in the reference gas chamber per unit time that is a rate of change with time of the detected value of the first current, based on the detected value of the first current, and correct the detected value of the second current, based on the estimated change amount of the oxygen concentration in the reference gas chamber per unit time.

2. The gas sensor according to claim 1, wherein:
   the control circuit is further configured to estimate the change amount of the oxygen concentration in the reference gas chamber based on the rate of change with time of the detected value of the first current, calculate a correction value based on the rate of change with time of the detected value of the first current, and correct the detected value of the second current based on the correction value.

3. The gas sensor according to claim 2, wherein:
   the control circuit is further configured to decrease the correction value in accompaniment with elapse of time or in accompaniment with elapse of steps.

4. The gas sensor according to claim 2, wherein:
   the control circuit is further configured to reset the correction value in response to a change direction of the oxygen concentration in the reference gas chamber switching from a positive direction to a negative direction or from a negative direction to a positive direction.

5. The gas sensor according to claim 3, wherein:
   the control circuit is further configured to reset the correction value in response to a change direction of the oxygen concentration in the reference gas chamber switching from a positive direction to a negative direction or from a negative direction to a positive direction.

6. The gas sensor according to claim 1, wherein:
   the gas sensor further includes
     a third cell that includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode; and
   the control circuit is further configured to
     detect a value of the third current, and
     correct the detected value of the third current based on the estimated change amount of oxygen concentration in the reference gas chamber.

7. The gas sensor according to claim 2, wherein:
   the gas sensor further includes
     a third cell that includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode; and
   the control circuit is further configured to
     detect a value of the third current, and
     correct the detected value of the third current based on the estimated change amount of oxygen concentration in the reference gas chamber.

8. The gas sensor according to claim 3, wherein:
the gas sensor further includes
- a third cell that includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode; and the control circuit is further configured to
- detect a value of the third current, and
- correct the detected value of the third current based on the estimated change amount of oxygen concentration in the reference gas chamber.

9. The gas sensor according to claim 4, wherein:
the gas sensor further includes
- a third cell that includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode; and the control circuit is further configured to
- detect a value of the third current, and
- correct the detected value of the third current based on the estimated change amount of oxygen concentration in the reference gas chamber.

10. The gas sensor according to claim 5, wherein:
the gas sensor further includes
- a third cell that includes a fifth electrode that is provided in the measurement chamber and a sixth electrode that is provided in the reference gas chamber, through which a third current flows which depends on a concentration of residual oxygen that is contained in the exhaust gas from which oxygen has been removed by the first cell by a voltage being applied between the fifth electrode and the sixth electrode; and the control circuit is further configured to
- detect a value of the third current, and
- correct the detected value of the third current based on the estimated change amount of oxygen concentration in the reference gas chamber.

11. The gas sensor according to claim 2, wherein the control circuit is further configured to:
- add a present value of the correction value with a previous value of the correction value to calculate a basic value of the correction value.

12. The gas sensor according to claim 11, wherein the control circuit is further configured to:
- calculate a gain based on a time constant when the present value of the correction value is calculated; and
- multiply the basic correction value by the gain G.

* * * * *